US008159903B2

(12) United States Patent
Skrobanek et al.

(10) Patent No.: US 8,159,903 B2
(45) Date of Patent: Apr. 17, 2012

(54) UNDERWATER COMMUNICATION SYSTEM

(75) Inventors: Gerald Skrobanek, Hard (AT);
Giovanni Distefano, Turin (IT)

(73) Assignee: Mares S.p.A., Rapallo (IT)

(*) Notice: Subject to any disclaimer, the term of this patent is extended or adjusted under 35 U.S.C. 154(b) by 317 days.

(21) Appl. No.: 12/574,033

(22) Filed: Oct. 6, 2009

(65) Prior Publication Data

US 2010/0091612 A1    Apr. 15, 2010

(30) Foreign Application Priority Data

Oct. 10, 2008  (IT) ............................. GE2008A0080

(51) Int. Cl.
*H04B 11/00* (2006.01)
*H04B 13/02* (2006.01)
*B63C 11/26* (2006.01)

(52) U.S. Cl. ....................................................... 367/134

(58) Field of Classification Search ................... 367/124, 367/134
See application file for complete search history.

(56) References Cited

U.S. PATENT DOCUMENTS

| 5,738,092 | A | 4/1998 | Mock et al. |
| 6,125,080 | A | 9/2000 | Sonnenschein et al. |
| 2002/0176323 | A1 | 11/2002 | Magine et al. |
| 2010/0091612 | A1* | 4/2010 | Skrobanek et al. ........... 367/134 |

FOREIGN PATENT DOCUMENTS

EP     2175575 A1  *  4/2010

OTHER PUBLICATIONS

Kertens B. et al., "Poster abstract: Seastar underwater acoustic local area network", Sep. 14, 2007, XP002560214, WUWNet 2007, Canada.
Rhodes M., "Electromagnetic propagation in sea water and its value in military systems", Jul. 10, 2007, XP002560215, Seas DTC, Proceedings of Second Annual Conference, Edinburgh.
Yin-Jun Chen et al., "Ordered CSMA: a collision-free MAC protocol for underwater acoustic networks", Sep. 29, 2007, pp. 1-6, XP031229229, Oceans 2007, IEEE, Piscataway, NJ, USA.
Hayat Doukkali et al., "A Cross Layer Approach with CSMA/CA Based Protocol and CDMA Transmission for Underwater Acoustic Networks", Sep. 1, 2007, pp. 1-5, XP031168741, IEEE International Symposium on Personal, Indoor and Mobile Radio Communications, PIMRC, IEEE, PI, XX.
European Search Report issued Dec. 18, 2009 for European Application No. 09 17 2052, European Patent Office, Munich, Germany.

* cited by examiner

*Primary Examiner* — Daniel Pihulic
(74) *Attorney, Agent, or Firm* — Stites & Harbison PLLC; Marvin Petry

(57) ABSTRACT

Underwater communication system comprising a plurality of communication modules, each provided with a microprocessor, a memory, a transmitter and a receiver unit; these communication modules are incorporated in an underwater computer and in a plurality of underwater equipment devices; the underwater computer and the underwater equipment devices form an underwater master/slave communication network for short and long ranges, in which each device forms a node and communicates in a bidirectional way with the other nodes of the network administered by a main underwater computer or master unit; each node of the network is identified by a unique identification code which is assigned dynamically by the master unit of the network, and is provided with at least one of said communication modules for short-range communication; a data and message transmission protocol is provided for this network, for administering the bidirectional network between the various nodes of the network.

11 Claims, 1 Drawing Sheet

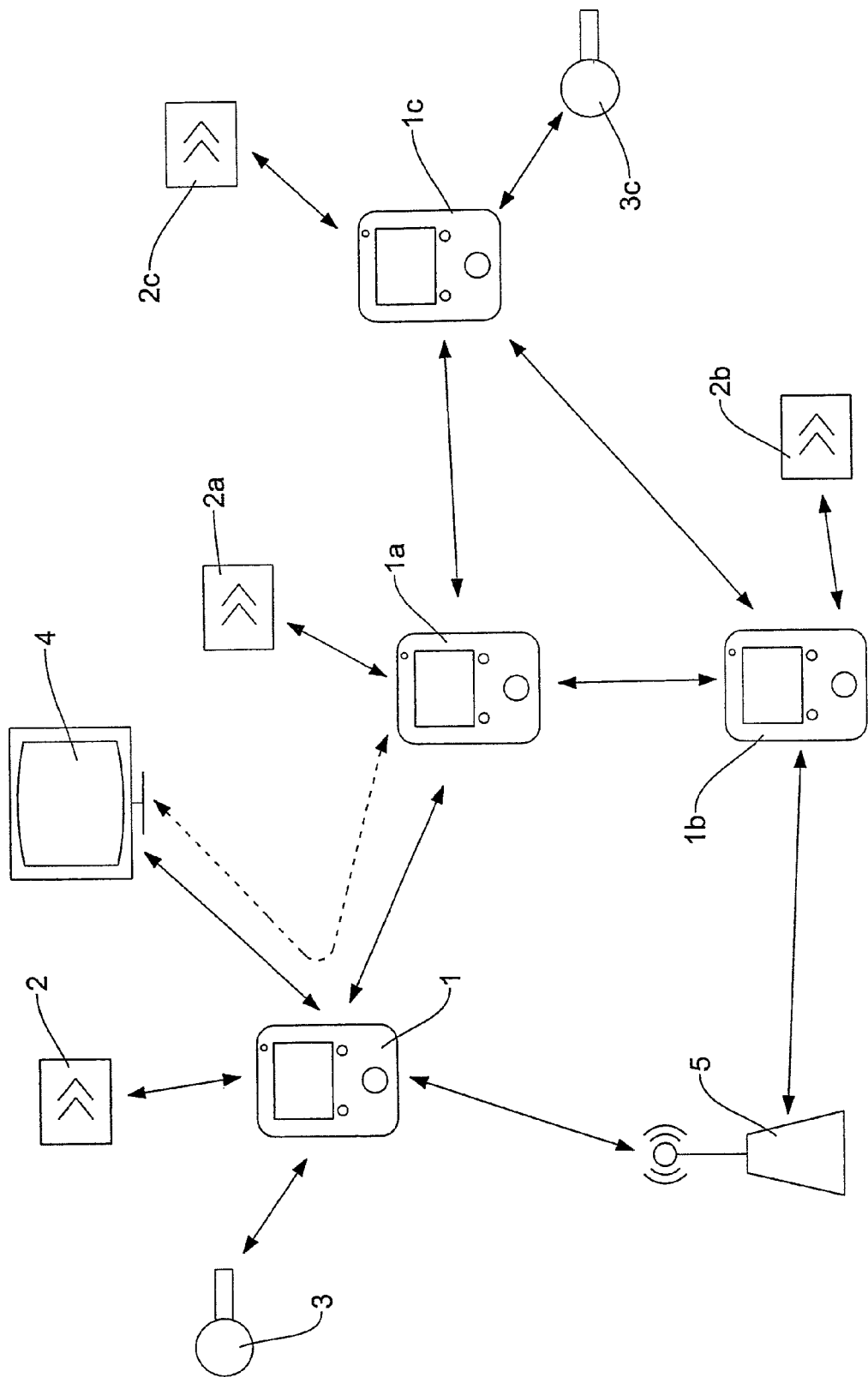

UNDERWATER COMMUNICATION SYSTEM

BACKGROUND AND SUMMARY OF THE INVENTION

The present invention relates to an underwater communication system.

There are known underwater communication systems, used for monitoring underwater breathing apparatus for example, which comprise means for transmitting data from an underwater breathing apparatus to a receiving unit, which can be a portable computer with a display unit, such as a wrist computer, used by a diver, thus making the diver aware of data such as the duration of decompression phases, the amount of air remaining in the cylinders, and the like.

U.S. Pat. No. 5,738,092 describes a monitoring device for portable breathing apparatus, comprising a pressure gauge by means of which the pressure in the pressurized container of the breathing apparatus is detected, and comprising a transmitter by means of which a signal corresponding to the detected pressure is transmitted at regular intervals. The transmitter is also provided with a signal generator device which generates an identification signal which is characteristic of the transmitter. The pressure signal and the identification signal are received and verified by a receiver. If the identification signal matches a comparison signal stored in the receiving device, the measured pressure value is shown on the display.

Such known underwater communication systems have a number of drawbacks: in the first place, the communication between the wrist computer and the pressure sensor of the cylinders is unidirectional, in the sense that the data travel solely from the pressure sensor of the breathing apparatus to the wrist computer, in such a way that, for example, the wrist computer has to wait for the data sent by the pressure sensor on each occasion, without being able to request it at any time; furthermore, the identification and data signals sent by the transmitter are in clear, and therefore may be incorrectly intercepted, for example by another communication system belonging to another diver or groups of divers.

The object of the present invention is therefore to provide an underwater communication system which overcomes the drawbacks of the known underwater communication systems cited above; which enables one or more transmitter units and one or more receiver units to communicate in a bidirectional way; in which the data exchanged by the receiver unit with the transmitter unit are encrypted, and therefore can be understood only if the apparatus of the system has decryption keys; and which can be used to create an underwater communication network among a plurality of apparatus or units belonging to a diver, for example a wrist computer, the pressure sensor of the cylinders, and the inflatable jacket worn by the diver.

This object is achieved by the present invention by means of an underwater communication system comprising a plurality of communication modules, each provided with a microprocessor, a memory, a transmitter and a receiver unit, said communication modules being incorporated in an underwater computer and in a plurality of underwater equipment devices, characterized in that the underwater computer and the underwater equipment devices form an underwater master/slave communication network for short and long ranges, in which each device forms a node and communicates in a bidirectional way with the other nodes of the network administered by a main underwater computer or master unit, each node of the network being identified by a unique identification code which is assigned dynamically by the master unit of the network and being provided with at least one of said communication modules for short-range communication and, if necessary, with at least one communication module for long-range communication, a data and message transmission protocol being provided for said network for the administration of the network for the operations of connection, detection of the devices present in the network, and short-range and long-range data transmission.

BRIEF DESCRIPTION OF THE DRAWINGS

Other features and advantages of the present invention will be made clear in the course of the following description, to be considered as an example without restrictive intent, with reference to a single attached drawing, in which:

FIG. 1 is a block diagram of an underwater communication network.

DESCRIPTION OF THE PREFERRED EMBODIMENTS OF THE INVENTION

With reference to FIG. 1, an underwater communication network using the present system may be made up, for example, from a computer housed in an underwater watch (master unit 1) which dynamically requests the pressure data for the diver's cylinder or cylinders as a function of the depth and air consumption of the diver; a cylinder pressure acquisition device, in other words a sensor which forms the slave unit 2 and is mounted on a portable breathing apparatus to collect the pressure data and transmit them, by means of a communication device with which it is provided, to other devices, mainly the master unit, which can process and display these data; an electronic buoyancy control device (slave unit 3) provided with a communication module and capable of monitoring parameters such as the depth of the diver, the diver's ascent and descent velocity, and the like; a data display device (slave unit 4) incorporated in the diver's mask and also comprising a communication module; and finally a master unit 5 formed by a long-range repeater which uses ultrasound, for example, to send messages created or selected by the wrist computer at long range. This master unit 1 belonging to a diver can communicate with other master units 1a, 1b, 1c used by other divers, each of which is connected to its own slave units 2a, 2b, 2c, 3c. The arrows linking the master units to the slave units indicate the bidirectionality of the connection between the elements of the network. Data transmission within an area close to the diver is carried out using electromagnetic waves, preferably at a frequency in the range from 5 kHz to 100 kHz. On the other hand, the long-range transmission makes use of ultrasonic waves. The master units also optimize the energy required for the operation of the network, and therefore control the consumption of the batteries with which they are provided in order to provide the maximum transmission speed compatible with minimum energy consumption.

Thus, if the master unit is a wrist computer and the slave unit is a cylinder pressure sensor, the operation of the slave unit can be modified by the requirements of the master unit. For example, the master unit may order the slave unit to increase the frequency of reading the cylinder pressure as a function of the depth, so as to provide a more accurate measurement of the cylinder pressure in conditions in which air consumption is greater. Similarly, the wrist computer may order the pressure sensor to reduce the reading frequency, if, for example, the diver is at a lesser depth. This provides an advantageous reduction in the consumption of the battery fitted to the cylinder sensor. The data transferred by the master unit to the slave unit and vice versa are also encrypted, and therefore, in order to be read, they require a specific decryption key stored in the master and created in a random way, in such a way that, if data with the same identification codes are sent from another diver's transmitter, for example, the receiver considers them as extraneous and erroneous data.

Control of the wireless data transmission from the master units to the slave units and vice versa is based on a CSMA/CD (Carrier Sense Multiple Access with Collision Detection) protocol. The first operation to be carried out when connecting a master unit to one or more slave units, for example, is the procedure of recognition and connection of the master unit to the slave unit concerned. This procedure is launched by the master unit, for example the underwater wrist computer, which sends a connection message made up of:

synchronization data; indication of the type of device;
the type of message sent (a connection message in this case);
the size of the message;
a random 32-bit number to be used for the calculation of the key for decrypting the messages;
a control data element, namely the FCS (Frame Check Sequence), for determining whether the transmitted message is consistent as regards the cryptography key;
a control data element, namely the radio FCS, for determining whether the transmitted message is correct as regards radio transmission.

The slave unit which receives the message first checks its consistency by means of the radio FCS, and then sends a connection acceptance message (ACK, Affirmative Acknowledgement) which has the same structure as the message sent by the master unit. The master unit receives the message and uses two random numbers to generate the key for decrypting future messages. The same procedure is carried out in the slave. The messages following the recognition and connection procedure are generated as follows:

the transmitter device, a slave unit for example, creates a message and calculates the FCS data;
the same device uses the key created in the connection procedure to encrypt the message;
the radio FCS is calculated for this encrypted message.

The receiver, in other words the master unit, acts in the opposite way, as follows:

it uses the radio FCS to check the consistency of the received data;
it decrypts the message, using the decryption key created in the connection procedure;
using the FCS data, it checks whether the message was generated with the same key, in other words the key relating to the associated transmitter or transmitters, and, if the result is positive, it considers the message to be valid and processes its contents.

The present data communication system using a network of devices communicating in a bidirectional way has a number of advantages over the known communication systems. In the first place, all the available information, such as the immersion time, the depth, and information on the decompression phases can be used to control the communication actively, for example by requesting the air pressure values at shorter intervals, together with the quantity of air remaining in the cylinders, if the diver is descending to greater depths. In addition to the freely selectable transmission intervals, the battery power can be regulated to provide lower battery consumption. The transmission process between a transmitter and a receiver is more secure, since both devices can confirm the reception of data or request a resending of the data in case of erroneous or incomplete transmission, thus making it unnecessary to use interpolated values for non-received data, which may be incorrect. The present bidirectional communication system thus ensures the consistency of data transmission and increases the safety of the diver. Furthermore, as mentioned above, the present system enables a varying number of underwater devices to be controlled digitally. Each of these digitally controlled devices can request set-up information and/or generate data to be processed subsequently or to be shown on a display unit which may be positioned on the mask, for example. It is therefore advantageous for the diver to bring together all the information in a central processing unit, such as a wrist computer, instead of having a plurality of devices with separate user interfaces incorporated in each element of the underwater equipment.

We claim:

1. An underwater communication system comprising a plurality of communication modules incorporated in an underwater computer and in a plurality of underwater equipment devices, the underwater computer and the underwater equipment devices forming an underwater master/slave communication network for short and long ranges, each device forming a node which communicates in a bidirectional way with the other nodes of the network, the network being administered by a main underwater computer or master unit, each node of the network being identified by a unique identification code which is assigned dynamically by the master unit of the network and being provided with at least one of said communication modules for short-range communication, a data and message transmission protocol being provided for said network for administering the bidirectional network between the various nodes of the network, said computer and said plurality of underwater equipment devices being associated with a diver, each communication module being provided with a microprocessor, a memory unit, a transmitter and a receiver unit and an encryption unit which encrypts the said identification code of each node of the bidirectional underwater communication network and the various data exchanged between the various master and slave units.

2. A system according to claim 1, at least one node of the network being preferably provided with at least one communication module for long-range communication.

3. A system according to claim 1, said transmission protocol being usable to connect operations, detection of the devices present in the network, and short-range and long-range data transmission.

4. A system according to claim 1, comprising a device which acquires the pressure in the cylinder or cylinders, mounted on a portable breathing apparatus and which is provided with a communication device which acquires and transmits the pressure data to other devices which process or display said data, the master unit being capable of requesting said pressure data as a function of the diver's depth and air consumption.

5. A system according to claim 1, comprising an electronic buoyancy control device which is provided with a communication device and capable of monitoring the diver's depth and velocity of descent and ascent.

6. A system according to claim 1, comprising a diver's mask provided with a communication device which can show, by way of a suitable display unit, the data received and possibly processed by the master unit.

7. A system according to claim 1, the data transmission in an area close to the diver being carried out by way of electromagnetic waves with a data transmission frequency preferably in the range from 5 kHz to 100 kHz, while long-range data transmission is carried out by way of ultrasonic waves.

8. A system according to claim 1, the data transmission control being based on a CSMA/CD (Carrier Sense Multiple Access with Collision Detection) protocol.

9. A system according to claim 1, wherein each receiving device of said bidirectional underwater communication network is associated with two or more transmitting devices, said receiver units being connectable to each other and if necessary to a long-range repeater.

10. A method of using the system according to claim 1, comprising a procedure for recognition and connection of a master unit to one or more slave units comprising the following steps:

- transmitting a connection message from the master unit to one or more slave units;
- transmitting synchronization data and an indication of the type of device;
- transmitting of a random 32-bit number to be used for the calculation of the key for decrypting the messages;
- transmitting of a control data element, namely the FCS (Frame Check Sequence) data, to determine whether the transmitted message is consistent as regards the cryptography key;
- transmitting a control data element, namely the radio FCS, to determine whether the transmitted message is correct as regards radio transmission;
- receiving by the slave unit of the message sent by the master unit and verification of the consistency of this message by way of the radio FCS;
- transmitting by the slave unit of a connection acceptance message (ACK, Affirmative acknowledgement) having the same structure as the message transmitted by the master unit;
- receiving by the master unit of the message received from the slave unit according to the step of transmitting by the slave unit, and generating a key for decrypting future messages.

11. A method according to claim 10, wherein the messages following the recognition and connection procedures are generated as follows:

- the transmitter device creates a message and calculates the FCS data;
- the transmitter device uses the key created in the connection procedure to encrypt the message;
- the radio FCS is calculated for the encrypted message;
- after receiving the message from the slave unit, the master unit checks the consistency of the received data, using the radio FCS;
- the master unit decrypts the message, using the decryption key created in the connection procedure;
- using the FCS data, the master unit checks whether the message was generated with the key relating to the associated transmitter or transmitters, and, if the result is positive, the master unit considers the message to be valid and processes its contents.

\* \* \* \* \*